US006694713B1

United States Patent
MacDonald

(10) Patent No.: US 6,694,713 B1
(45) Date of Patent: Feb. 24, 2004

(54) EQUINE MULTI-PURPOSE PROTECTOR BOOT

(75) Inventor: David Duncan MacDonald, Premaydena (AU)

(73) Assignee: Old Mac's Corporation Pty. Ltd., West Footscray (AU)

( * ) Notice: Subject to any disclaimer, the term of this patent is extended or adjusted under 35 U.S.C. 154(b) by 0 days.

(21) Appl. No.: 09/806,092

(22) PCT Filed: Sep. 23, 1999

(86) PCT No.: PCT/AU99/00800

§ 371 (c)(1),
(2), (4) Date: Jan. 8, 2002

(87) PCT Pub. No.: WO00/16614

PCT Pub. Date: Mar. 30, 2000

(30) Foreign Application Priority Data

Sep. 23, 1998 (AU) ............................................. PP 6125
Oct. 6, 1998 (AU) ............................................. PP 6380
Dec. 15, 1998 (AU) ............................................. PP 7731

(51) Int. Cl.$^7$ ............................. B68C 5/00; A01L 3/00
(52) U.S. Cl. ............................. 54/82; 168/18; 36/111
(58) Field of Search ............................. 54/82; 168/26, 168/17, 18, 22, 14, 12, 28; 36/111

(56) References Cited

U.S. PATENT DOCUMENTS

| 1,089,293 A | 3/1914 | Twist |
| 4,444,269 A | 4/1984 | Laurent |
| 5,224,549 A | 7/1993 | Lightner |

FOREIGN PATENT DOCUMENTS

| AU | 23578/35 | 7/1936 |
| DE | 2550539 | 5/1977 |
| FR | 683409 | 6/1930 |
| GB | 240385 | 10/1925 |

Primary Examiner—Son T. Nguyen
(74) Attorney, Agent, or Firm—Volpe and Koenig, P.C.

(57) ABSTRACT

An equine multi-purpose protector boot comprising: (a) a sole member rigid enough to resist lateral movement of the hoof with an upwardly depending rim extending around its periphery at least at the toe and at each side, the inner surface of the rim being substantially vertical at least in the region of the sides: (b) at least one flexible side flap located at each side of the hoof, attached to or integral with the sole member; (c) an outer compressive cover provided with means to force the side flap into conformation with the shape of the hoof; (d) a flexible heel member attached to the rear of the sole member and including at least one fastening strap (16) adapted to pass around the pastern bone within the range of 2 to 3.5 cm above the coronary band.

18 Claims, 5 Drawing Sheets

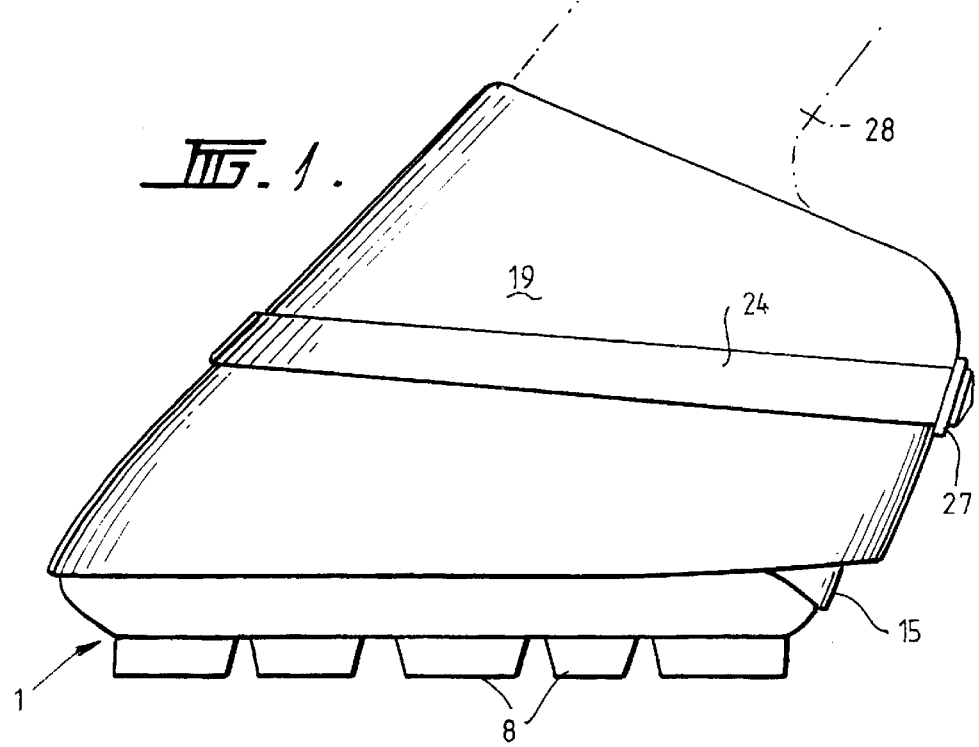
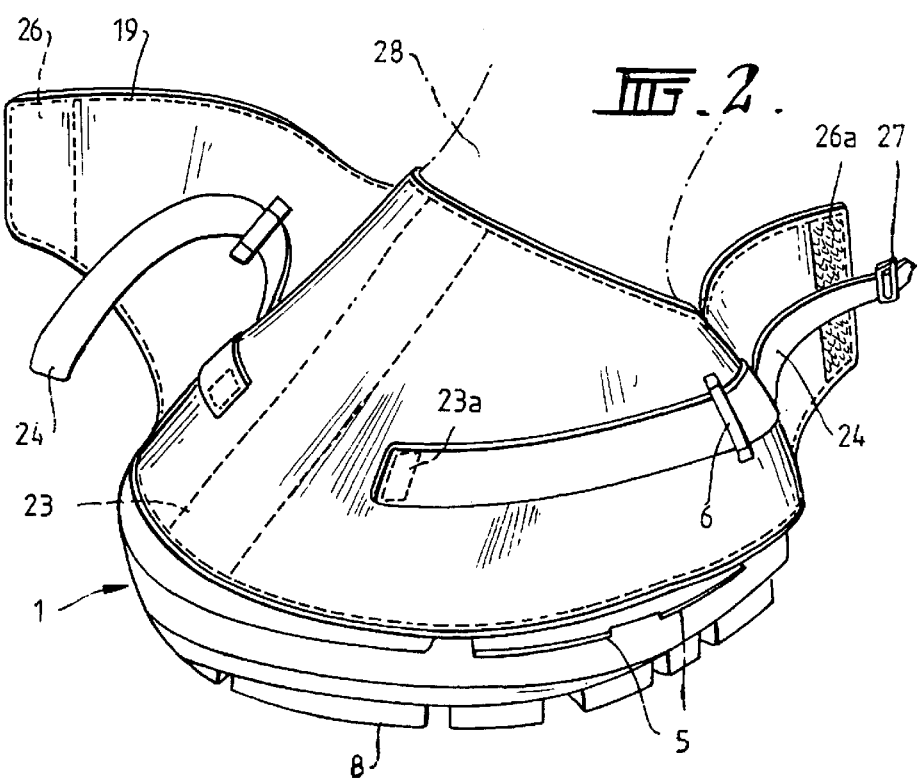

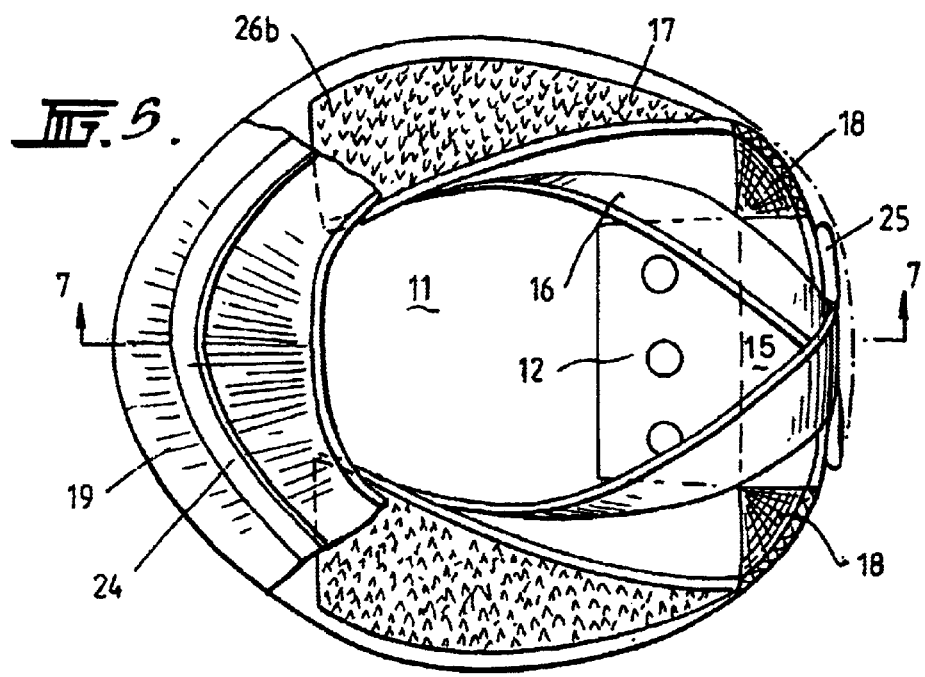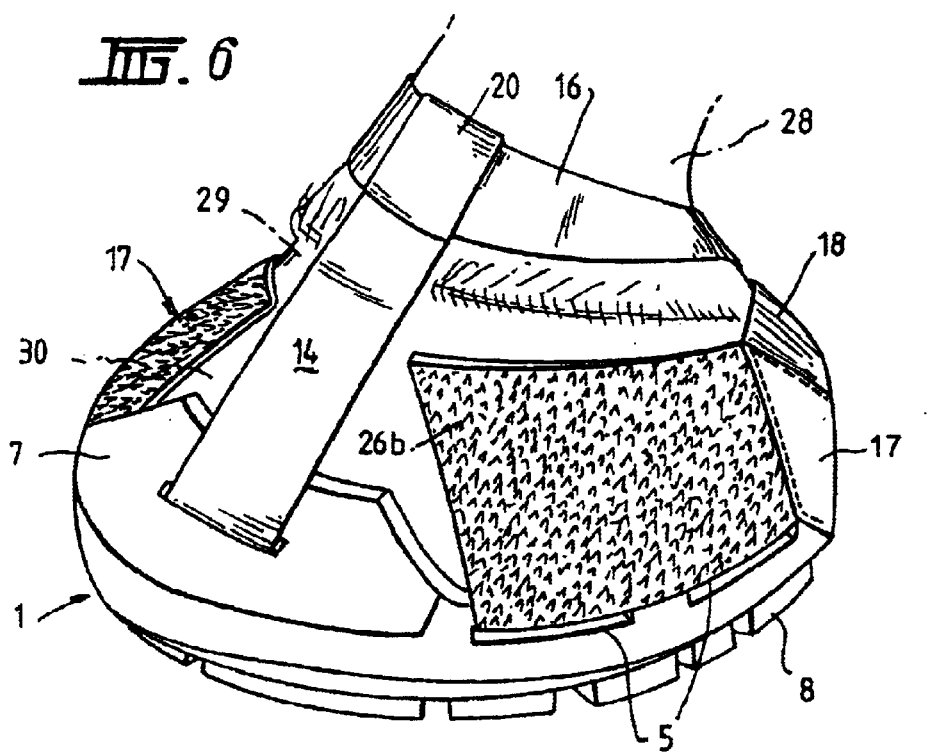

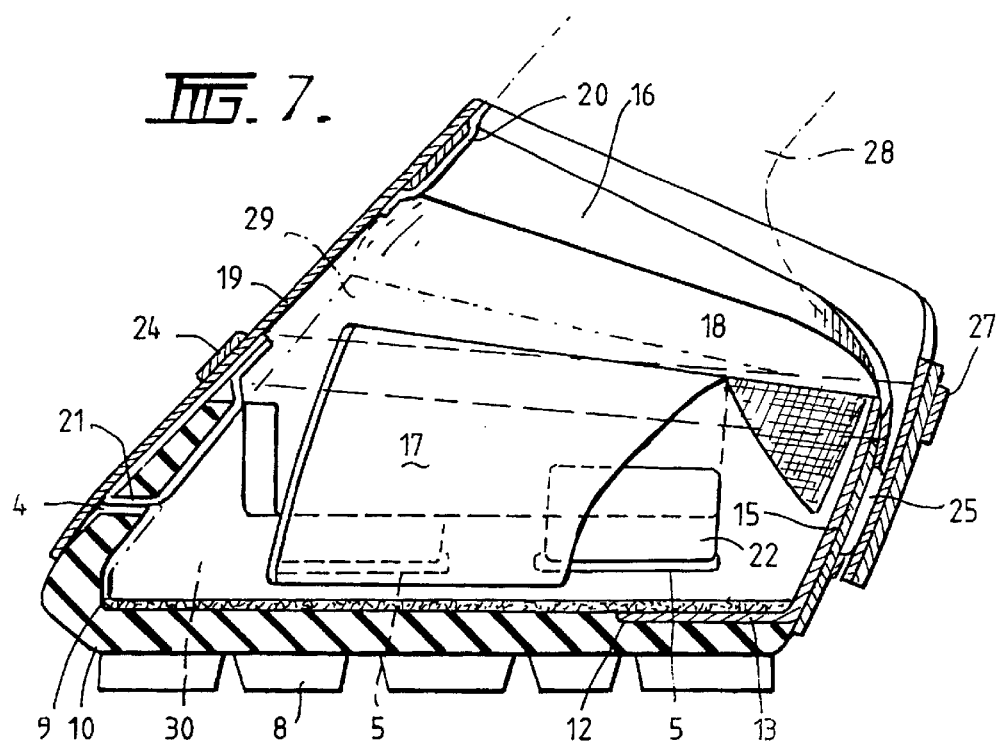
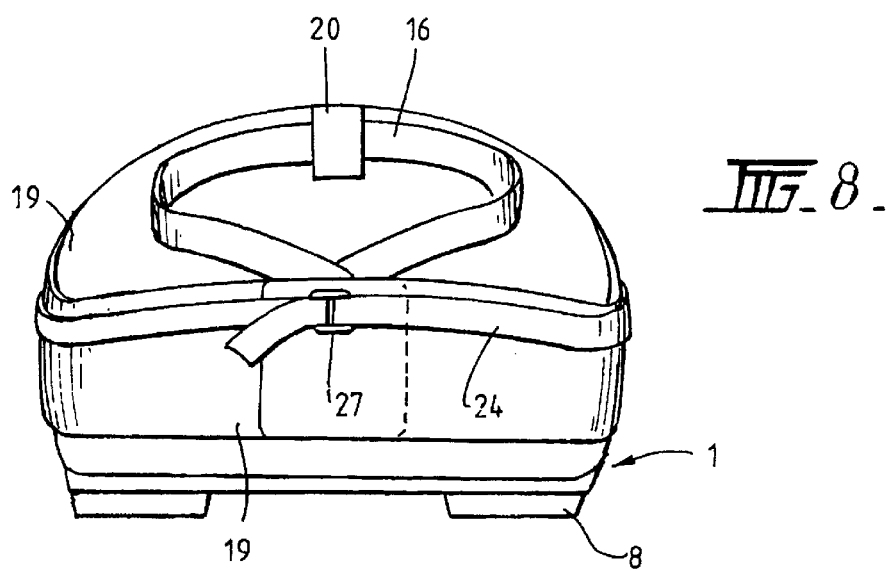

EQUINE MULTI-PURPOSE PROTECTOR BOOT

FIELD OF INVENTION

This invention relates to the field of equine protector boots with the aim of assisting in the eradication of major problems encountered by the equestrian industry with the soundness of horses' hooves. As such the invention provides a removable protective covering for the hoof of a horse.

BACKGROUND OF THE INVENTION

For many years it has been known that for a horse to travel and remain sound it needs feet that are in good form and condition. This principle is embodied in the often-quoted old horseman's saying "no feet, no horse".

Traditionally, horses have been shod with the well-known metal shoe. Such shoes protect and support the outer edge of the hoof and are attached to the foot by nailing through the horny tissue of the hoof wall. These conventional shoes wear with use and also must be removed and replaced every 6 to 10 weeks as the horse's hoof grows.

There are also many varied problems of disease and damage that are associated with horses' feet. Abscesses in the hoof, bruises in the sole, corns, torn or ripped hoof walls or thrown shoes are just a few conditions that will prevent a horse from being ridden and/or will result in the confinement of a horse to a stable or paddock.

There is a need for a multi-purpose boot designed for easy and rapid fitting to the hoof, providing both good traction from the sole and comfort for the horse. Such a boot could be used as a substitute for a conventional shoe in day to day riding or training situations and also would have a wide range of veterinary uses (eg protecting bruised soles, abscesses in the hoof, torn hoof walls where nailing is not possible).

The present invention seeks to meet this need.

SUMMARY OF THE INVENTION

This invention accordingly provides an equine multi-purpose protector boot comprising:

A—a sole member with an upwardly depending rim extending around the periphery of the sole member at least at the toe and at each side, wherein the inner surface of said rim is substantially vertical at least in the region of the sides of the sole member to allow differing shaped hooves to drop down onto the platform of the sole without restriction, and the said rim is of sufficient rigidity to provide resistance to lateral movement of the hoof;

B—at least one side flap located at each side of the hoof, attached to or integrated with the sole member, and composed of flexible material which is able to conform to the shape of the sidewalls of the hoof;

C—an outer compressive cover, provided with means to force the side flaps into conformation with the shape of the hoof and prevent lateral movement of the hoof in the boot;

D—a heel member, flexibly attached to the rear of the sole member and shaped to include at least one fastening strap adapted to pass around the pastern bone at a point within the range of 2 to 3.5 cm above the coronary band of the hoof in such a manner that it prevents the foot from lifting out of the boot.

PREFERRED ASPECT OF THE INVENTION

In a preferred embodiment, re-closable complementary or mating fasteners are located on the outer surface of the side flaps and the inner surface of the compressive cover. By this means the compressive cover is releasably attached to the side flaps.

It is highly preferred that the fasteners are located or arranged in such a manner that the compressive cover may be attached to the side flaps at a plurality of positions thus allowing for variations in hoof shape and ensuring an "encasing" fit and compression of the side flaps. In the most preferred embodiment the fasteners are of hook and loop type, such as VELCRO™.

To achieve easier fitting of the boot, it is preferred that the flexible side flaps can be opened or spread outwards as the foot is placed into the boot.

If desired, the side flaps could continue around to the front of the boot and, in some circumstances, could be joined together as a unitary flap.

The flexible side flaps may be integrated with the sole member as a two or multi phase composition to achieve the required rigidity and hard wearing characteristics of the sole member together with the suppleness and flexibility of the side flaps.

The outer compressive cover may be attached either directly or indirectly to the sole member at one or more points substantially at the toe of the sole member.

To allow for variations in length and shape of the hoof, it is particularly preferred that the upwardly depending rim on the side member does not extend along the rear edge of the sole member, thus providing an open back to the sole. This allows the hoof to hang over the edge and when the heel member of the boot is in place it can be tightened to provide an exact, encasing fit. Such an exact fit eliminates any rearward projections at the sole of the hoof and prevents the horse overreaching and clipping the back of the heel.

The height of the upwardly depending rim from the upper surface (or "platform") of the sole member may vary from 5 to 25 mm; but it is preferable that the rim is 20 mm in height. The required height depends partially on the rigidity of the material from which the rim is constructed to achieve the purpose of restricting lateral movement of the hoof relative to the sole member.

A reinforced toecap, similar in shape and function to the toecap of conventional metal shoes, may be provided on the sole member. In a more preferred form, the toecap may be wider and/or higher and encase a larger portion of the toe of the hoof than a conventional toecap. This structure helps to locate and lock the hoof into the front of the sole member. If the angle of the toecap approximates to the angle of the hoof, the result is a key-like function of the toecap. It is preferred that the angle is within the range of from 50° to 53°, which is thought to conform generally with the angle of the toe in most horses. Particularly preferred is an angle of 52°. As the fastening strap of the heel member is tightened, the heel of the boot forces the hoof tip under the toecap.

In order to maintain the correct angle of the hoof to protect the tendons from over flexing, it is important that the point at the front of the sole member, where the toe of the hoof rests against the rim or toecap, is vertically in line with the break over point of the bottom of the sole member.

Preferably the fastening strap of the heel member is made of a resilient material which allows for movement of the horse but does not stretch enough to allow the boot to be pulled off if it is caught or trodden on.

It is highly preferred that the strap runs around the short pastern bone (i.e. the second phalanx) and over the lateral cartilage; just below the moving joint and just above the widest point of the coronary band; thus allowing the strap to sit snugly to maintain the most secure position possible on the leg. Any higher and the strap would be located on a moving part, which would restrict the joint. Any lower and the strap could not be stopped from sliding down the hoof.

In a preferred embodiment, the strap is arranged to cross over itself From its attachment point on one side of the heel of the hoof, the strap is passed across the heel, around the pastern, then back to another attachment point at the opposite side of the heel. By this arrangement, there is further means to limit or prevent the downward slide of the strap over the side of the hoof.

Preferably the lower surface of the sole member is lugged to aid in traction. The lugs may be provided integrally with the sole member or may be independent and constructed of a different material such as a hard wearing metal. Independent lugs may be removable and/or interchangeable. For some uses, such as in training, the lower surface of the sole member will be designed to provide hard-wearing qualities. In other, veterinary, uses the sole member may be chosen to provide cushioning qualities.

Materials for the manufacture of the boot include leather, canvas, synthetic such as KORDUX™, CORDURA™, NITREX™), rubber and nylon and should be chosen for their qualities of strength, breathability and water and abrasion resistance. Preferable materials for the construction of the sole member include polyurethane rubbers such as TPR and TPU.

It is important for the material of the heel member to be relatively strong because it is subject to stretch forces in holding the boot to the foot and to wear by abrasion against the heel of the horse.

Preferably the boot is designed and constructed of suitable materials so that the tightening of the fastening strap (or straps) exerts a pressure on the hoof from front to back. This results in a squeezing effect in which the back of the boot moves forward and the front moves back. The boot may be designed so that these relative movements are slight or significant in degree.

BRIEF DESCRIPTION OF THE DRAWINGS

In order that the invention may be more readily understood and put into practical effect, reference will be made to the accompanying drawings, in which:

FIG. 1 is a side view of a boot according to the invention shown fitted to a hoof.

FIG. 2 is a perspective view of the boot of FIG. 1 shown with the compressive cover unfastened.

FIG. 5 is a plan view of a boot with the compressive cover shown partially in ghost form.

FIG. 6 is a perspective view of a boot with hoof in place, but shown without the compressive cover.

FIG. 7 is a sectional view of the boot along the line 7—7 of FIG. 5.

FIG. 8 is a rear perspective view of the boot showing the securing strap of the compressive cover in a fastened position.

Figure 3:
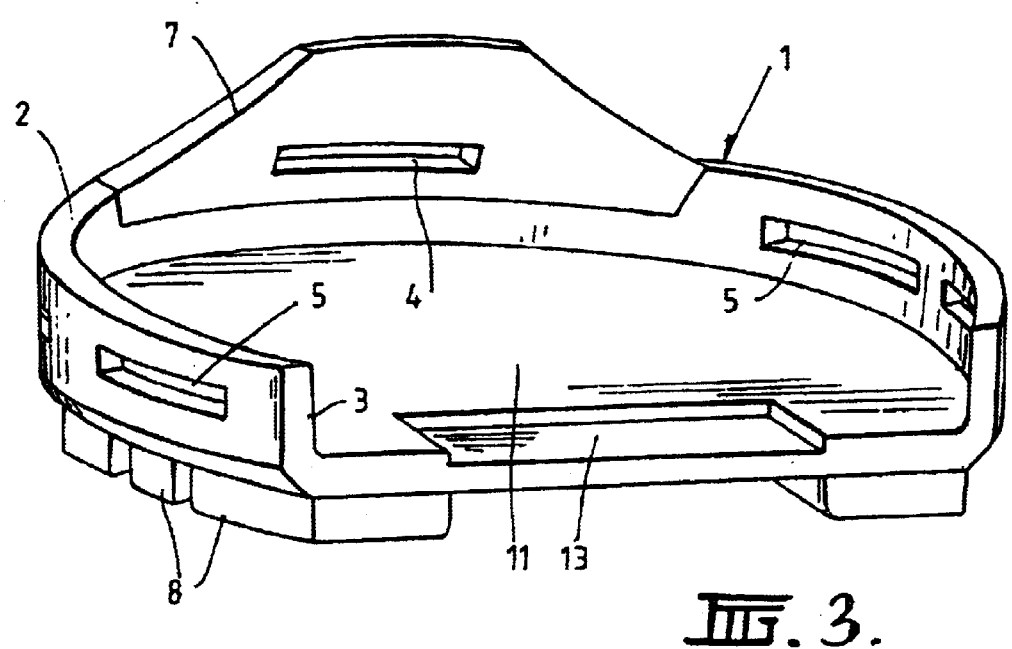
FIG. 3 is a perspective view of a sole member from the rear.

INTEGER LIST 1 sole member
2 rim
3 inner surface of rim
4 first attachment slot
5 second attachment slot
6 holder
7 toecap
8 lug
9 point of rest of toe
10 break over point
11 platform of sole
12 tongue
13 lowered region
14 toe strap
15 heel member
16 heel-fastening strap
17 side flap
18 gusset
19 compressive cover
20 eye
21 first loop
22 second loop
23 stitching
24 securing strap
25 link
26 VELCRO™
27 buckle
28 pastern
29 coronary band of hoof
30 hoof wall

DETAILED DESCRIPTION WITH RESPECT TO THE DRAWINGS

FIGS. 1 to 10 illustrate a particular embodiment of an equine multi-purpose protector boot according to the invention.

The boot, shown in FIG. 1 fitted to the hoof of a horse, includes a sole member 1 having lugs 8 on the underside to assist in traction. The boot further includes an outer compressive cover 19 that is held in place partly by a securing strap 24 and buckle 27. Additional means for holding the compressive cover 19 in place include complementary VELCRO™ fasteners 26 and 26a located at the rear edges of the cover as illustrated in FIG. 2.

Figure 4:
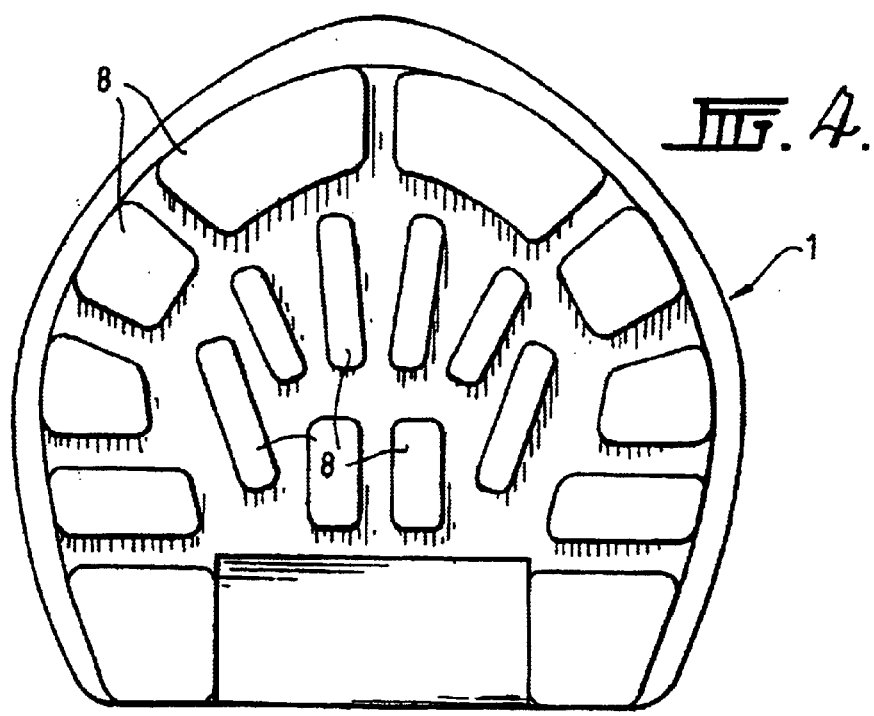
FIG. 4 is a plan view from below of a sole member.

A sole member 1 is shown from two views in FIGS. 3 and 4. An upwardly depending rim 2 extends around the periphery of the sole but does not continue to extend along the rear edge of the sole member, thus providing an open back to the sole platform 11.

Shown most clearly in FIG. 3, the inner surface 3 of the rim at each side of the sole is vertical until the sides reach the toecap 7 allowing the hoof to drop down onto the platform 11 of the sole without restriction. The inner surface 3 of the rim at the base of the toecap 7 is also vertical for a height of from 5 to 10 mm. This feature allows the toe of the hoof to fit flush against the toecap 7. If the toecap 7 met the sole platform 11 at an acute angle, the point of the toe of the hoof would not make proper contact with the lower end of the toecap 7 leaving an unfilled gap at the angle.

In this embodiment, shown in FIG. 7, the toecap 7 forms an angle of 52° with the platform 11 of the sole to approximate to the angle of the toe of the hoof. (An angle of between 50 to 53° is thought to conform generally with the angle of the toe in most horses.) The point of rest 9 of the toe at the intersection of the toecap 7 and the sole platform 11 is vertically aligned with the break over point 10 of the sole.

Shown in FIG. 3 is a lowered region 13 in the sole platform 1. In this embodiment this region is about 2 mm lower than the plane of the sole platform 11.

This feature serves the purpose of allowing a tongue 12 of the heel member 15 to be attached to the sole member 1 by riveting (as illustrated in FIG. 5). The lowered region 13 provides a recess to accommodate the tongue 12 so that the sole of the hoof does not sit directly upon it.

As is also illustrated in FIG. 3, the sole platform 11 has a substantially flat surface to which may be applied a layer of shock absorbing material. Suitable materials include EVA (sometimes known as SORBATHANE™) and PROTHANE™. Because the layer is applied over the tongue 12, it is not crucial to ensure that the tongue 12 is wholly within the recess of the lowered region 13.

The lower surface of the sole member has integrally moulded lugs 8. A suitable lug pattern designed to provide an aid to traction is illustrated in FIG. 4.

The sole member is provided with various slots for attachment of other components of the boot. Alternatively, the components may be integral with the sole member or could be attached by a process, such as vulcanization or riveting, which would not require the presence of the slots.

A first attachment slot 4 is located in the toecap 7 for the attachment of the toe strap 14 as a first loop 21. Second attachment slots 5 at each side allow for the attachment of side flaps 17. The means of these attachments are best illustrated in FIGS. 6 and 7.

FIG. 6 is a side view of the boot in place but shown without the compressive cover 19 to illustrate the attachment to the sole member 1 of various components of the boot.

A webbing toe strap 14 is passed in a first loop 21 through the first attachment slot 4 in the toecap 7. The upper end of the toe strap 14 is provided with an eye 20 through which the fastening strap 16 of the heel member 15 passes.

The side flap 17 (in this embodiment constructed of leather) is attached in a similar manner by passing second loops 22 through the second attachment slots 5 as illustrated. A layer of NITREX™ with an over layer of soft leather (not shown) is provided on the inner surface of the side flaps for the purposes of insulation and padding. The NITREX™ has qualities of cushioning and moulding and the soft leather is moisture absorbent.

The CORDURA™ or NITREX™ outer compressive cover 19 is attached to the boot by stitching 23 to the toe strap 14 along the lines indicated in FIG. 2. In this embodiment, as shown in FIGS. 2 and 8, the compressive cover 19 is provided with two securing straps 24 and a buckle 27. The compressive cover also includes complementary VELCRO™ fasteners 26 and 26a to allow convenient fastening and to provide additional fastening strength. The straps 24 are attached to the compressive cover 19 only at or near the toe by stitching 23a rather than by stitching along a substantial portion of their length (FIG. 2). The straps are passed through a holder 6 to keep them in place conveniently. By this arrangement, when the straps 24 are tightened they will pull in and compress the outer compressive cover 19 all around the hoof instead of just at the rear of the hoof.

VELCRO™ fastening is provided on the outer surface 26b of the side flaps 17 as shown in FIG. 6. Complementary VELCRO™ fastening 26c is provided on the inner surface of the compressive cover 19 as shown in FIG. 10.

The lower edge of the compressive cover 19 lies along the upper edge of the rim 2 of the sole member 1, thus abutting with the sole member 1. By this arrangement, the bottom edge of the compressive cover 19 is protected to a certain degree from abrasion and intrusion of debris by being flush with the rim 2.

Figure 9:
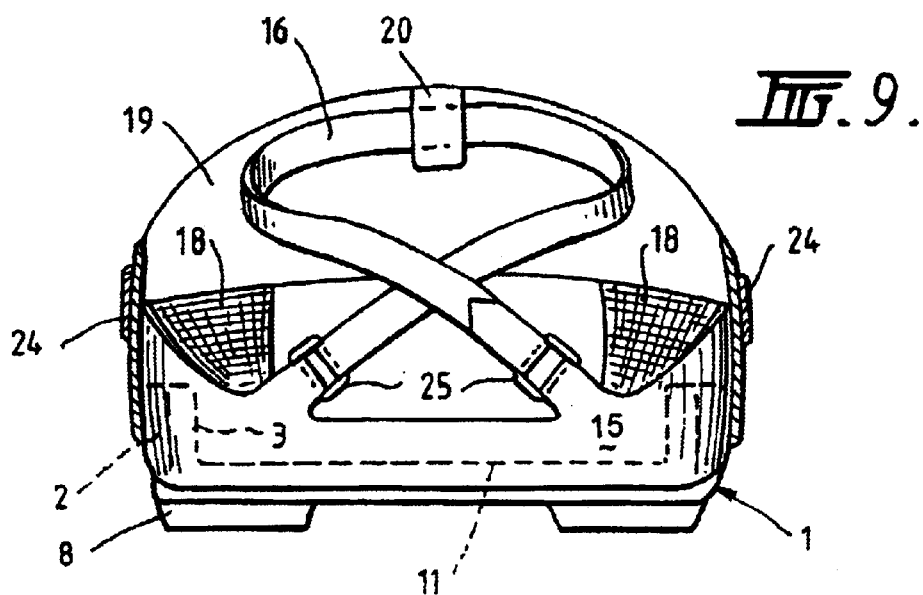
FIG. 9 is a rear view, with the rear of the compressive cover partially in ghost form, showing the fastening strap of the heel member in which the strap is arranged to cross over itself.
Figure 10:
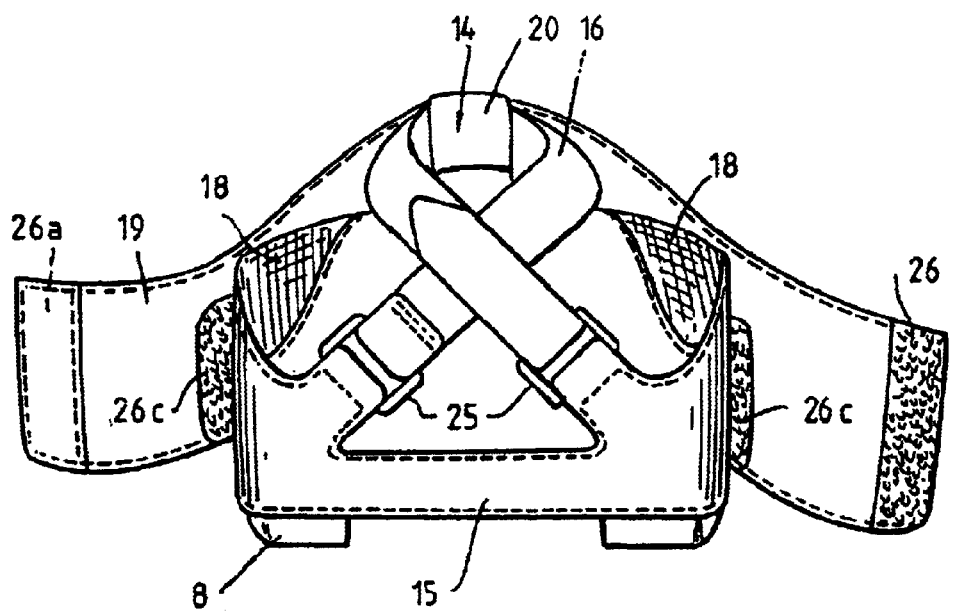
FIG. 10 is a rear view of the boot shown in FIG. 9 showing the compressive cover in an open position.

FIGS. 9 and 10 show the arrangement of the fastening strap 16 of the heel member 15. In this embodiment, the fastening strap 16 is fixed at a link 25 on one side of the heel. The strap is passed to the opposite side, as illustrated, around the pastern and back to another link 25 on the opposite side of the heel. VELCRO™ (not shown) is provided as fastening means.

In the first stage of fitting, the hoof makes contact with the platform 11 of the sole, the side flaps 17 of the boot and the heel member 15 of the boot. The toe of the hoof is hard up against the reinforced toecap 7 preventing the hoof from sliding forward over the front of the boot. The rigid rim 2 of the sole member 1 also prevents any sideways movement of the hoof.

The next stage is to bring the upper part of the heel member 15 forward towards the pastern bone. This entirely covers the heel of the hoof. The elastic gussets 18, located at either side edge of the heel member 15 and joining the heel member 15 and the side flaps 17, allow the heel member 15 to stretch backwards to accommodate a horse that has a larger heel-bulb or is longer in the length of hoof.

The toe strap 14 and the side flaps 17 are lowered inward towards the hoof.

Once contact is made, the heel-fastening strap 16 is passed around the side of the pastern bone 28 approximately 2 to 3.5 cm above the coronary band 29. The fastening strap 16 then passes through the eye 20 of the toe strap 14 and is returned to the rear of the boot through the securing link 25. The next stage is to pull the fastening strap 16 up as tight as possible and then fold it back over the securing link 25. The strap, with VELCRO™ attached, is pressed back down firmly onto itself.

This means that the toe and heel of the boot are now prevented from any downward movement. The heel-fastening strap 16 is now exerting pressure to the front of the pastern bone preventing any movement of the boot. The boot has thus moulded to the shape of the hoof.

The next step is to secure the outer compressive cover 19 to the side flaps 17 totally encasing the hoof. The compressive cover 19 has VELCRO™ on its inner surface and the side flaps 17 have VELCRO™ on their outer side. The compressive cover 19 is pressed down firmly against the side flaps 17 together with a rearward movement. The rear edges of the compressive cover 19 are fastened together and held in place by VELCRO™ fasteners 26 and 26a. This takes any looseness out of the cover and places it firmly against the hoof wall, totally encasing the hoof. The securing strap 24 is passed across the back of the boot and tightened into its buckle 27 to secure the compressive cover 19.

The boot will then be precisely located and firmly held in place.

The invention should be understood to embrace many further modifications and embodiments as will be readily apparent to persons skilled in the art and which will be deemed to reside within the broad scope and ambit of the invention, there having been set forth herein only the broad nature of the invention and a certain specific embodiment by way of example. In that regard, the disclosures in the associated Australian provisional patent applications (numbers PP6125, PP6380 and PP7731) are incorporated herein by reference.

What is claimed is:

1. An equine multi-purpose protector boot comprising:

a sole member having a platform for receiving a hoof and an upwardly depending rim extending around a periphery of the sole member platform at least at the front and at each side, wherein an inner surface of said rim is substantially vertical in the region of the sides of the sole member platform to allow differing shaped hooves to drop down onto the platform without restriction, and said rim is of sufficient rigidity to provide resistance to lateral movement of a hoof positioned on the platform;

a first side flap located at one side of the sole member and a second side flap located at an opposite side of the sole member, said side flaps attached to or integrated with the sole member, and composed of flexible material which is able to conform to the shape of the sides of a hoof;

an outer compressive cover, provided with means to force the side flaps into conformation with the shape of a hoof and prevent lateral movement of a hoof positioned on the platform;

a heel member, flexibly attached to the rear of the sole member; said heel member selectively shaped to include at least one fastening strap and to enclose the heel of a hoof positioned on the sole platform;

re-closable complementary or mating fasteners located on an outer surface of the side flaps and an inner surface of the compressive cover, the fasteners being arranged in such a manner that the compressive cover attaches to the side flaps at a plurality of positions to allow for variations in hoof shape; and the cover is configured to provide total encasement of a hoof positioned on the sole platform from the platform to above the side flaps and the heel member.

2. A boot as defined in claim 1, wherein the side flaps are configured to be spread outwards as a hoof is placed into the boot.

3. A boot as defined in claim 1, wherein the compressive cover attaches either directly or indirectly to the sole member at one or more points substantially at a front portion of the rim of the sole member.

4. A boot as defined in claim 1, wherein the upwardly depending rim of the sole member does not extend along a rear edge of the sole member, thus providing an open back to the sole member.

5. A boot as defined in claim 1, wherein the height of the upwardly depending rim from the platform of the sole member is within the range of from 5 to 25 mm.

6. A boot as defined in claim 1, wherein a reinforced toecap is provided on the sole member.

7. A boot as defined in claim 6, wherein the toecap is as wide as a front region of the sole member.

8. A boot as defined in claim 7, wherein the angle of the toecap approximates to the angle of a selected hoof.

9. A boot as defined in claim 8, wherein the angle of the toecap is within the range of from 50° to 53°.

10. A boot as defined in claim 6, wherein a rest point at the front of the sole member platform, where the toe of a hoof positioned on the platform rests against the sole member rim or the toecap, is vertically in line with a break over point of a bottom of the sole member.

11. A boot as defined in claim 1, wherein a rest point at the front of the sole member platform, where a toe of a hoof positioned on the platform rests against the sole member rim or a toecap, is vertically in line with a break over point at the front of a bottom of the sole member.

12. A boot as defined in claim 1, wherein the fastening strap of the heel member is made of a resilient material which allows for movement of a hoof positioned on the platform but does not stretch enough to allow the boot to be pulled off if it is caught or trodden on.

13. A boot as defined in claim 12, wherein the fastening strap of the heel member runs around the short pastern bone and over the lateral cartilage, just below the moving joint and just above the widest point of the coronary band of a hoof positioned on the platform in such a manner that it prevents the hoof from lifting out of the boot.

14. A boot as defined in claim 1, wherein the fastening strap of the heel member is configured to run around the short pastern bone and over the lateral cartilage, just below the moving joint and just above the widest point of the coronary band of a hoof positioned on the platform in such a manner that it prevents the hoof from lifting out of the boot.

15. A boot as defined in claim 14, wherein the fastening strap is configured to pass from a first attachment point on one side of the heel member across the heel, around the pastern bone, and then back to a second attachment point at an opposite side of the heel member.

16. A boot as defined in claim 1, wherein a lower surface of the sole member is provided with means to aid in traction.

17. A boot as defined in claim 1, wherein the boot is designed and constructed of suitable materials so that a tightening of the fastening strap about a hoof positioned on the platform exerts a pressure on the hoof from front to back resulting in a squeezing effect by which the back of the boot is moved forward and the front of the boot is moved backward.

18. A boot as defined in claim 1, wherein the fastening strap of the heel member is adapted to pass around the pastern bone of a hoof positioned on the platform, at a point within the range of 2 to 3.5 cm above the coronary band of the hoof, in such a manner that it prevents the hoof from lifting out of the boot.

* * * * *